United States Patent Office 3,228,962
Patented Jan. 11, 1966

---

3,228,962
N-(2,2-PENTAMETHYLENE PYRROLIDINO METHYL) TETRACYCLINE AND SALTS
Donald N. McGregor and Lee C. Cheney, Fayetteville, N.Y., assignors to Bristol-Myers Company, New York, N.Y., a corporation of Delaware
No Drawing. Filed Oct. 5, 1964, Ser. No. 401,693
2 Claims. (Cl. 260—326.3)

This invention relates to a novel antibacterial agent of unusual properties which is an Einhorn derivative of tetracycline, i.e. with 1-azaspiro[4.5]decane, and to its salts and methods of preparation.

Cheney et al. have produced certain derivatives of tetracycline by reacting tetracycline with a source of formaldehyde and certain secondary amines in what has been called a Mannich reaction but is more properly classified as an Einhorn reaction in view of Ann., 343, 207, 210 (1905); as to Cheney et al. see U.S. Patents 3,104,240 and 2,997,471 and J. Amer. Chem. Soc. 81, 1198–1201 (1959). Other derivatives of this general type have been disclosed, for example, by Lindner et al. in Canadian Patent 669,686 and South African application 3,169/57 and in Munch. med. Wochschr. 17, 661 (1958); by Blackwood et al. in U.S. Patent 3,042,716; by Wilkinson et al. in Canadian Patent 664,258; by Gradnick et al. in U.S. Patent 3,149,114; and by Kollar et al. in U.S. Patent 3,139,433.

It was the object of the present invention to provide a novel Einhorn derivative of tetracycline which, in comparison to known derivatives of this general type, exhibited decreased hydrolytic degradation to tetracycline in vitro and in vivo, did not form precipitates as rapidly in aqueous media on standing or on adjusting the pH over the range of 3 to 8, exhibited increased stability in aqueous media such as are used in parenteral administration, exhibited improved resistance to change in color as a solid and in solution, and exhibited blood levels on oral and parenteral administration in animals, including man, which were increased with respect to height and duration.

The objectives of the present invention have been achieved by the provision, according to the present invention, of a member selected from the group consisting of a basic compound of the formula

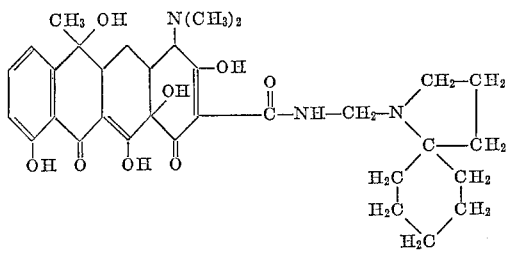

and nontoxic, pharmaceutically acceptable acid addition salts thereof.

Said nontoxic, pharmaceutically acceptable acid addition salts include salts with organic and inorganic acids which are prepared by simple addition of one or two equivalents of acid to the basic compound. These salts include those prepared from acids such as sulfuric, hydrochloric, nitric, phosphoric, sulfamic, tartaric, hydrobromic, hydriodic, glycolic, citric, maleic, succinic, acetic, ascorbic, gluconic, palmitic, oleic, lactic, pantothenic and the like, including penicillins.

The basic compound of the present invention is prepared according to the general procedures set forth in the patents and publications cited above or referred to therein. Thus, tetracycline or a salt thereof is reacted with at least one mole of a source of formaldehyde and about one mole of commercially available 1-azaspiro-[4.5]decane or salt thereof, such as the hydrochloride. The reaction is conveniently carried out in a solvent, e.g. methanol, ethanol, tertiary butanol, preferably with heating. The product is isolated by cooling and collecting by filtration, by lyophilizing the solution or by precipitating the product by the addition of another solvent such as ether.

Additional information is given by the following example which is for purposes of illustration only and not of limitation. All temperatures are given in degrees centigrade.

EXAMPLE

*N-(2,2-pentamethylenepyrrolidinomethyl)tetracycline*

To a solution of 3.28 g. (0.06 mole) of 55% formaldehyde in methanol ("Methyl Formcel") in 30 ml. of methanol was added 4.6 g. (0.033 mole) of 1-azaspiro-[4.5]decane (Aldrich Chemical Company). The resulting solution was stirred at ambient temperature (about 23°) for 75 minutes, then 30 ml. of methanol and 15.0 g. (0.03 mole) of tetracycline trihydrate was added. The resulting solution was stirred at 23° for 60 minutes, during which time a crystalline precipitate separated. The precipitate was removed by filtration, washed with methanol, and dried under high vacuum, yielding 10.85 g. (61%) of the desired product, N-(2,2-pentamethylenepyrrolidinomethyl)tetracycline, M.P. 168–170° dec., $\lambda_{max}$ (methanol—0.01 N HCl) 358 m$\mu$ (E, 15100), 270 m$\mu$ (E, 18500), 217 m$\mu$ (15400). The infrared and NMR spectra were consistent with those expected for the desired product.

*Analysis.*—Calc'd for $C_{32}H_{41}N_3O_8$: C, 64.52; H, 6.94; N, 7.05. Found: C, 65.00; H, 7.08; N, 7.33.

We claim:
1. A member selected from the group consisting of a basic compound of the formula

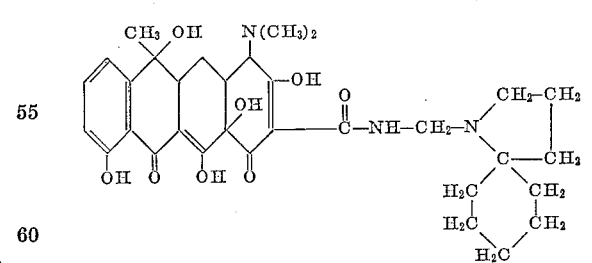

and nontoxic, pharmaceutically acceptable acid addition salts thereof.

2. The compound of the formula
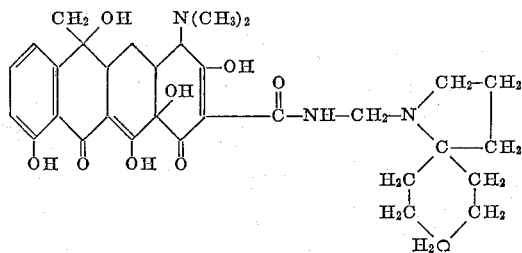
References Cited by the Applicant
UNITED STATES PATENTS
| | | |
|---|---|---|
| 2,997,471 | 8/1961 | Cheney et al. |
| 3,042,716 | 9/1962 | Blackwood et al. |
| 3,104,240 | 7/1963 | Cheney et al. |
| 3,139,433 | 6/1964 | Kollar et al. |
| 3,149,114 | 9/1964 | Gradnick et al. |
FOREIGN PATENTS
| | | |
|---|---|---|
| 664,258 | 6/1963 | Canada. |
| 669,686 | 9/1963 | Canada. |
OTHER REFERENCES
Gottstein et al.: J. Amer. Chem. Soc. 81, 1198–1201 (1959).
Seidel et al.: Munch. med. Wochschr. 17, 661 (1958).
The Merck Index, 7th ed., Merck and Co. Inc., Rahway, N.J., 1960, pp. 902 and 1021.
NICHOLAS S. RIZZO, *Primary Examiner.*